(12) United States Patent
Miller et al.

(10) Patent No.: US 9,233,588 B2
(45) Date of Patent: Jan. 12, 2016

(54) STRUT SUSPENSION ASSEMBLY SYSTEM

(71) Applicant: Stempf Automotive Industries, Inc., Minnetonka, MN (US)

(72) Inventors: Shawn Christopher Miller, Mllaca, MN (US); John W. Ryshavy, Wayzata, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 38 days.

(21) Appl. No.: 14/154,783

(22) Filed: Jan. 14, 2014

(65) Prior Publication Data

US 2015/0197128 A1    Jul. 16, 2015

(51) Int. Cl.
*B60G 7/00* (2006.01)
*B60G 3/28* (2006.01)

(52) U.S. Cl.
CPC *B60G 7/003* (2013.01); *B60G 3/28* (2013.01); B60G 2200/4622 (2013.01)

(58) Field of Classification Search
CPC ...... B60G 15/00; B60G 15/02; B60G 15/003; B60G 2200/4622; F16F 9/0454
USPC ............. 280/86.75, 86.753, 124.147, 86.752, 280/124.155
See application file for complete search history.

(56) References Cited

U.S. PATENT DOCUMENTS

| | | |
|---|---|---|
| 1,881,227 A | 10/1932 | Jackson |
| 2,233,627 A | 3/1941 | McDonald |
| 3,309,107 A | 3/1967 | Chieger |
| 3,378,250 A | 4/1968 | Milford |
| 3,578,355 A | 5/1971 | Oeder |
| 3,586,306 A * | 6/1971 | Reece et al. ....................... 267/3 |
| 3,954,257 A | 5/1976 | Keijzer et al. |
| 4,458,605 A * | 7/1984 | Herring et al. ........... 105/197.05 |
| 4,505,457 A | 3/1985 | Okada et al. |
| 4,585,211 A | 4/1986 | Griffin |
| 4,647,069 A | 3/1987 | Ijima |
| 4,721,325 A | 1/1988 | Mackoviak et al. |
| 4,921,271 A * | 5/1990 | Berry et al. .............. 280/86.756 |
| 5,080,388 A | 1/1992 | Berry et al. |
| 5,135,203 A | 8/1992 | Wijnhoven et al. |
| 5,467,971 A | 11/1995 | Hurtubise et al. |
| 5,470,049 A | 11/1995 | Wohler et al. |
| 5,788,262 A | 8/1998 | Dazy et al. |
| 5,957,651 A | 9/1999 | Takebayashi et al. |
| 5,967,536 A | 10/1999 | Spivey et al. |
| 6,053,112 A | 4/2000 | Jones, Jr. |
| 6,161,822 A | 12/2000 | Hurst et al. |
| 6,257,601 B1 | 7/2001 | Spears et al. |
| 6,260,835 B1 | 7/2001 | Angles et al. |

(Continued)

FOREIGN PATENT DOCUMENTS

| | | |
|---|---|---|
| EP | 566039 | 10/1993 |
| GB | 2075441 | 11/1981 |
| JP | 2004270717 | 9/2004 |

OTHER PUBLICATIONS

Topguncustomz.com, website, All Steel Leveling Spacers, pp. 1-2.

(Continued)

*Primary Examiner* — James English
(74) *Attorney, Agent, or Firm* — Haugen Law Firm PLLP

(57) ABSTRACT

An apparatus is described for increasing a range of height adjustment of a strut suspension system. The apparatus includes multiple spacers that together allow for increased range of adjustment and ease of installation.

16 Claims, 14 Drawing Sheets

(56) References Cited

U.S. PATENT DOCUMENTS

| | | | |
|---|---|---|---|
| 6,260,836 B1 * | 7/2001 | Aoyama et al. | 267/221 |
| 6,273,407 B1 | 8/2001 | Germano | |
| 6,293,572 B1 | 9/2001 | Robbins et al. | |
| 6,328,321 B1 | 12/2001 | Nolan | |
| 6,382,645 B1 | 5/2002 | Gravelle et al. | |
| 6,485,223 B1 | 11/2002 | Van Schmus et al. | |
| 6,820,883 B2 | 11/2004 | Lang et al. | |
| 6,827,184 B1 | 12/2004 | Lin | |
| 6,843,352 B2 | 1/2005 | Jacoby et al. | |
| 6,923,461 B2 | 8/2005 | Momose et al. | |
| 6,957,806 B2 | 10/2005 | Tubbs | |
| 6,986,519 B2 | 1/2006 | Smith | |
| 7,066,309 B2 | 6/2006 | Colas et al. | |
| 7,144,021 B2 * | 12/2006 | Carlson | 280/86.752 |
| 7,284,644 B2 | 10/2007 | Cmich et al. | |
| 7,311,181 B2 | 12/2007 | Germano et al. | |
| 7,328,887 B2 * | 2/2008 | Leonard | 267/122 |
| 7,537,225 B2 | 5/2009 | Ryshavy et al. | |
| 7,607,668 B2 | 10/2009 | Dugandzic et al. | |
| 7,665,743 B2 * | 2/2010 | Poncher et al. | 280/6.157 |
| 7,717,443 B1 * | 5/2010 | Carlson et al. | 280/124.155 |
| 7,780,178 B2 | 8/2010 | Ryshavy et al. | |
| 7,850,183 B1 | 12/2010 | Ryshavy et al. | |
| 7,976,039 B2 | 7/2011 | Hirve et al. | |
| 7,988,166 B2 | 8/2011 | Heeren et al. | |
| 8,109,492 B2 | 2/2012 | Winocur | |
| 8,196,942 B2 | 6/2012 | Heeren et al. | |
| 8,317,210 B1 * | 11/2012 | Ryshavy et al. | 280/124.147 |
| 8,516,672 B2 | 8/2013 | Wohlfarth | |
| 2004/0089990 A1 | 5/2004 | Labeau | |
| 2004/0155424 A1 | 8/2004 | Hicks et al. | |
| 2005/0017475 A1 | 1/2005 | Hellums | |
| 2007/0187919 A1 | 8/2007 | Furman | |
| 2010/0072719 A1 * | 3/2010 | Hsu | 280/86.757 |
| 2011/0318140 A1 | 12/2011 | Chang | |
| 2012/0098215 A1 | 4/2012 | Rositch et al. | |

OTHER PUBLICATIONS

Roughcountry.com, website, 2.5in GM Leveling Lift Kit, pp. 1-2.

* cited by examiner

STRUT SUSPENSION ASSEMBLY SYSTEM

CROSS-REFERENCE TO RELATED APPLICATIONS

Not Applicable.

FEDERAL SPONSORSHIP

Not Applicable

JOINT RESEARCH AGREEMENT

Not Applicable

TECHNICAL FIELD

The present invention relates to a height adjustment of a strut suspension generally, and more particularly to a spacer assembly that provides an option to raise the strut suspension to multiple distinct heights. The spacer assembly of the present invention simplifies repetitive installation and removal of the spacers without requiring disassembly of portions of the suspension or a repositioning of the drive shaft or steering column.

BACKGROUND

Over the years vehicle manufacturers have added complexity, components, and reduced size to vehicles which has often made it challenging to replace or modify certain portions of a vehicle suspension without disassembling other components of the vehicle. For example, after complete assembly of the vehicle, it may be desirable to raise the height of the vehicle's body by adding a conventional lift kit to the vehicle suspension between the strut assemblies and other portions of the suspension. However, addition of the conventional lift kit may require disassembly or removal of portions of the suspension before the conventional lift kit may be installed. Also, after installing conventional lift kit, the user may desire to either remove the kit or add other kits, which may also require disconnecting other vehicle components. For example, elevating a shock absorber of a strut above a control arm a sufficient distance to allow installation of conventional spacers below a lower mount may prove difficult without first removing other components of the vehicle.

By way of further example, although bolts attaching the strut assembly to a lower control arm of a wishbone style suspension may be initially installed with a bolt head underneath the control arm, it may be preferred to reposition the bolt to attach the strut assembly to the control arm having the bolt head above the control arm and strut lower mount. When the bolt head is positioned above the lower mount and after the strut suspension is installed, the spacing between the drive shaft and the top portion of the lower mount of the strut assembly may not be sufficient to allow removal of the bolt positioned under the drive shaft without requiring disassembly of portions of the suspension and repositioning of the drive shaft or steering column. Further, other suspension designs may not allow for adding conventional spacers between the strut and lower mount without removal or disassembly of portions of suspension components. There is accordingly a need for a spacer system that may be added or removed below the lower mount without requiring disassembly of portions of the suspensions assembly or repositioning of the drive shaft.

SUMMARY

Embodiments according to aspects of the invention include an apparatus for adjusting a height of a strut suspension. The apparatus may include first and second plates that include channels and ridges sized to engage in a nesting or mating relationship. The nesting plates allow a user to use the first plate, second plate or multiple plates to vary the cumulative spacer height by many distinct heights. The apparatus may also include one or more bolt receiving slots that allow engagement of the plate to a bolt from a side of the plate.

According to aspects of the invention each height adjustment plate may include a bolt receiving void formed in the plate that both extends through the plate from a top surface of the plate to a bottom surface of the plate and also extends from an edge of the plate into the body of the plate. The bolt receiving void may take the shape of an open ended passage, slot, guide, or other space that is void of plate material. The bolt receiving void receives an outer diameter of a selected bolt in a fitting relation within the plate.

A typical strut lower mount includes two bores that align coaxially with corresponding bores extending through the control arm. Accordingly, the spacer plate includes at least one bolt receiving void that aligns coaxially with one of the concentric bores of the lower mount and control arm. Further, the spacer plate further includes an additional bolt receiving aperture that aligns coaxially with the other concentric bores of the lower mount and control arm. The bolt receiving aperture may take the form of a solid walled cylindrical bore or hole extending from an upper surface of the plate through the plate to the bottom surface of the plate. Alternatively, the bolt receiving aperture may take the form of an open ended passage, slot, guide or other void that both extends through the plate from a top surface of the plate to a bottom surface of the plate and also extends from an edge of the plate into the body of the plate. The distance between the bolt receiving aperture and bolt receiving void is selected to align with the concentric bores of a strut lower mount bracket.

In use, according to aspects of the invention it is preferred to orient the bolt heads attaching the strut assembly to a lower control arm above the lower mount of the strut assembly. Prior to installing the spacer plates of the present invention it may be desirable to reposition the bolt heads to attach the strut assembly to the control arm from above the control arm and strut lower mount. Initially, reinstalling bolts from above the control arm may require disconnecting portions of the suspension and a repositioning of the drive shaft. Also, it may be desirable to select a bolt of sufficient length to allow any potential combination of spacers without removal of the bolt aligned under the drive shaft.

The bolt receiving void or slot within the plate of the present invention allows the user to engage the spacer plate to the bolt aligned under the drive shaft without removal of the bolt. Once the slot is engaged to the first bolt the plate may then be pivoted, rotated or otherwise positioned to allow the user to disengage the second bolt from the control arm to allow concentric positioning and alignment of the spacer plates apertures with the control arms and lower strut mount bolt holes. After aligning the concentric apertures and bolt holes the second bolt may re-engage the lower strut mount, spacer plate and lower control arm. In this manner, at least one or more of the first and second plates may be installed between the strut lower mount bracket and a control arm of the vehicles suspension, without the need to disassemble portions of the suspension and reposition the drive shaft, to raise the body of the vehicle above the ground a select distance. Further, the bolt receiving void or slot arrangement of the present invention allows the user to frequently add and remove spacers as seasonal demands may make more or less spacers desirable, without a significantly time consuming process.

In an alternative embodiment a third plate may be positioned between the strut upper mounting bracket and vehicle body to further elevate the vehicle body above the ground. In an embodiment according to aspects of the invention the first and second plates may be constructed in a u-shape and the third plate may be constructed having a cylindrical shape. The bolt receiving void may extend into the plate from an inner edge or outer edge of the u-shape to provide a locking arrangement of the plates between the control arm and lower mount once the second bolt is engaged. Those skilled in the art will recognize that the bolt receiving void may extend into the plate from an end of one of the u-shaped arms, however extending into the plate from an inner edge of the u-shaped arm is preferred.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
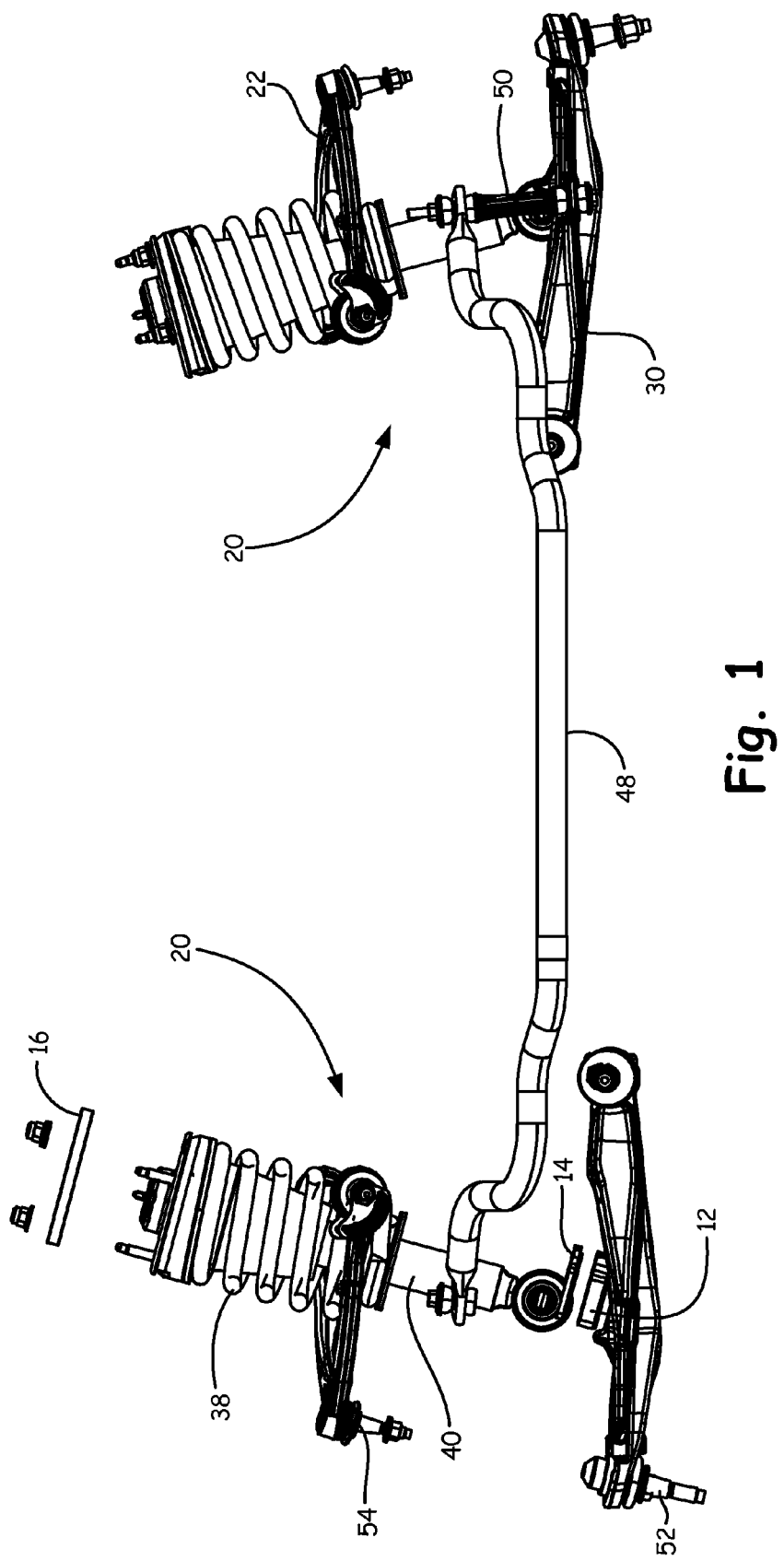
FIG. 1 is a front perspective view of a portion of a suspension system in accordance with an embodiment of the invention.
Figure 2:
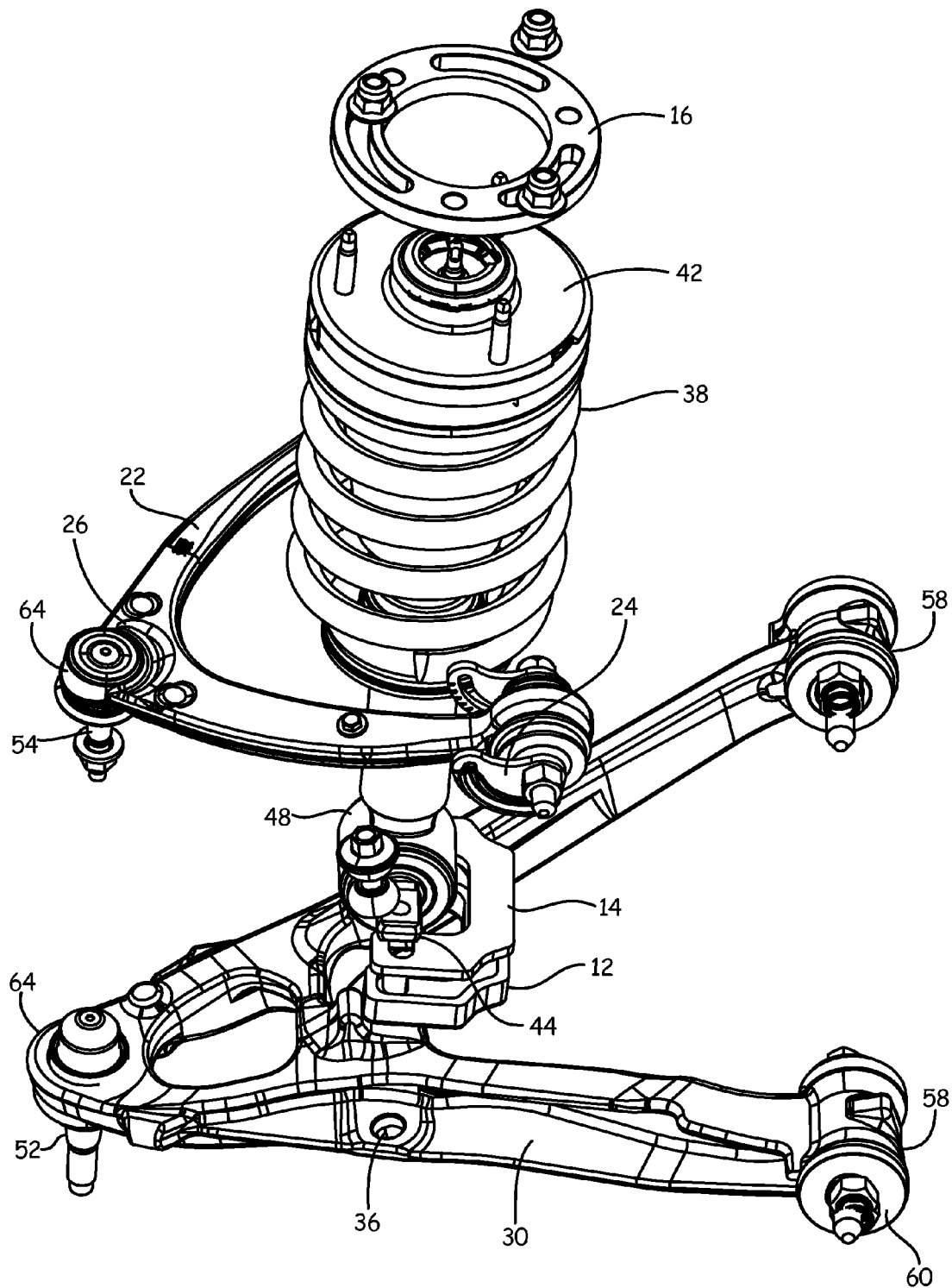
FIG. 2 is a left front perspective view of a portion of a wishbone suspension system of the type shown in FIG. 1.
Figure 3:
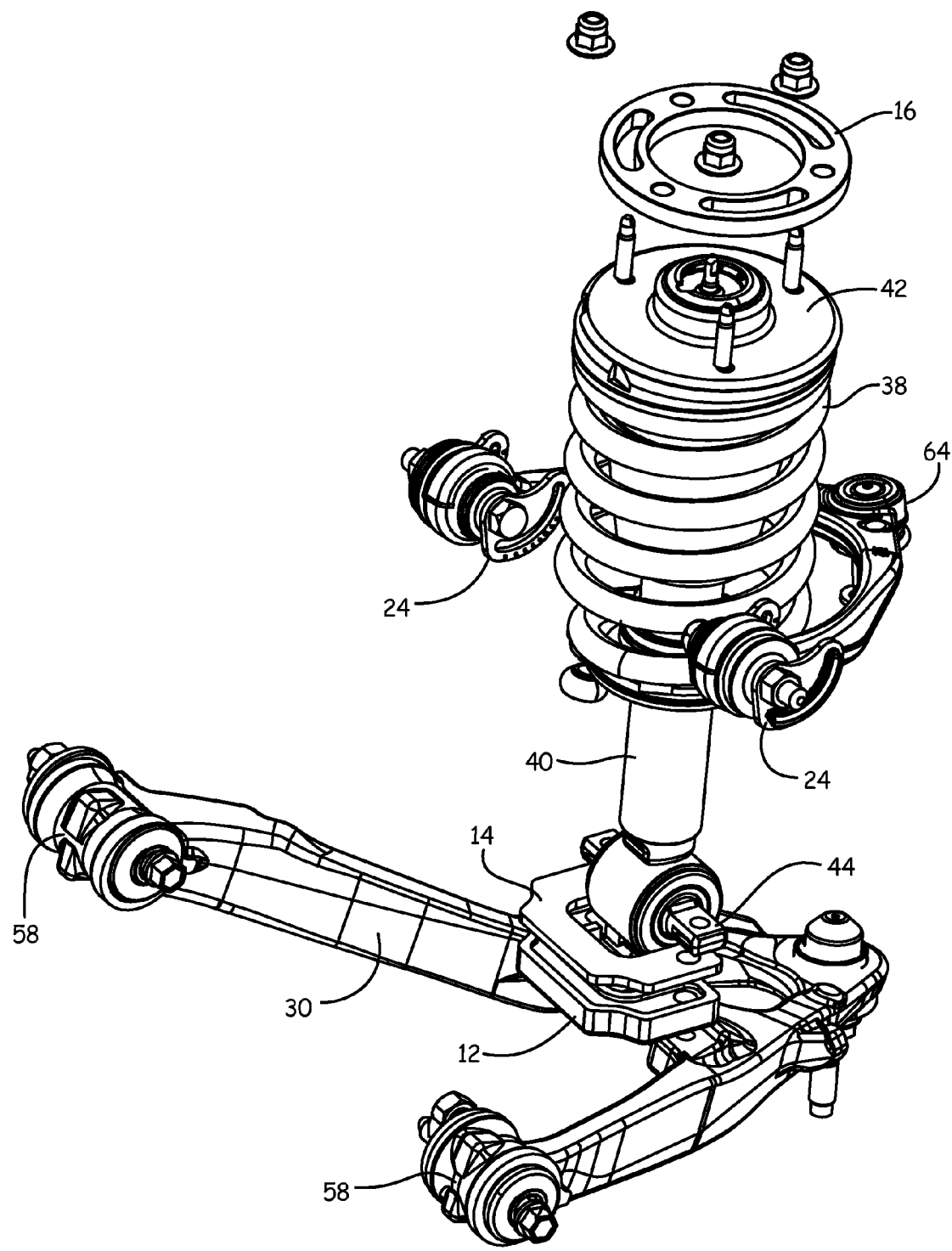
FIG. 3 is a left back perspective view of a portion of the wishbone suspension system of the type shown in FIG. 2.
Figure 4:
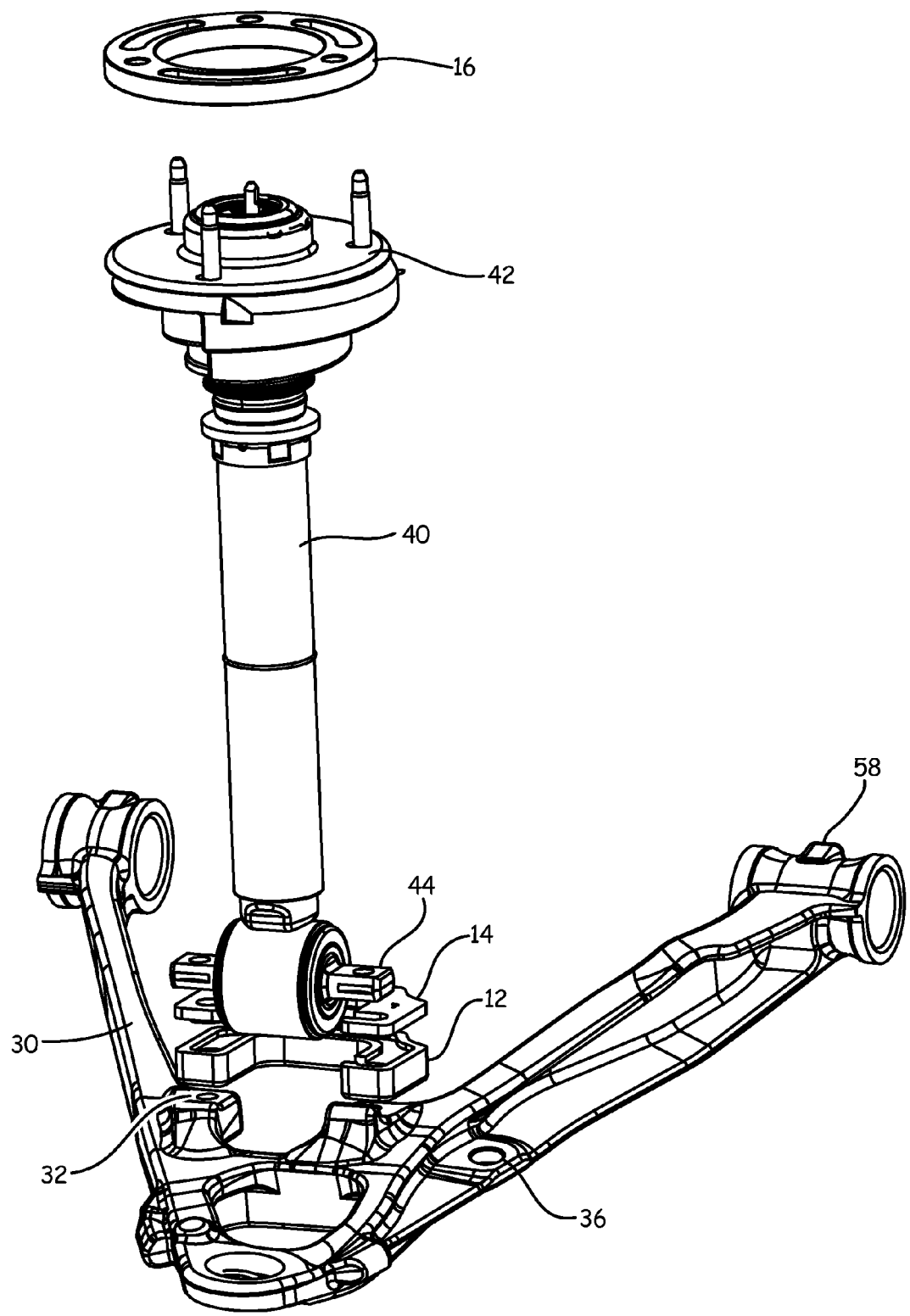
FIG. 4 is a partially disassembled outer end perspective view of a suspension system in accordance with an embodiment of the invention.
Figure 5:
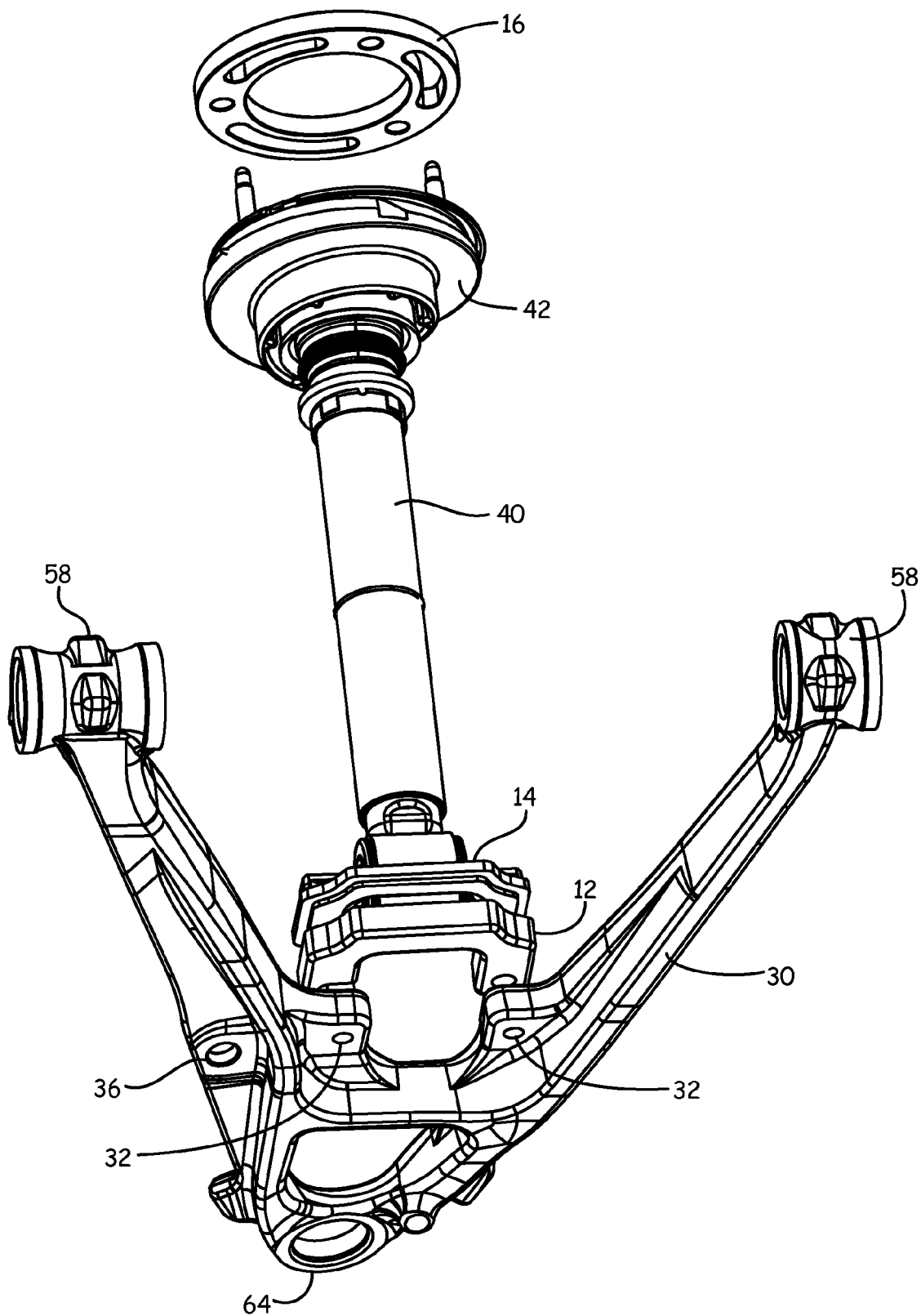
FIG. 5 is a partially disassembled lower opposing end perspective view of the suspension system of the type shown in FIG. 4.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The strut suspension spacer assembly of the present invention includes a combination spacer 10 comprising a first spacer 12 and second spacer 14. The first and second spacers 12 and 14 have varying thicknesses and engage in a nesting or mating relation. The first and second spacers may be used individually or together to provide many optional spacer adjustment heights. The spacer assembly may further include a third upper spacer 16. The lower spacers of the present invention are described herein positioned between a lower control arm of a wishbone suspension and a mount bracket of a shock absorber of the strut suspension. Those skilled in the art will appreciate that the spacers may be used with other suspensions and struts having varying configurations. Further, the shape of the upper and lower spacers may be modified as necessary to cooperate with the configuration of the mounting brackets of the strut.

Turning attention now to the Figures, the strut suspension spacers of the present invention will be described in greater detail. FIGS. 1-5 illustrates the positioning of the lower strut spacer combination 10 and third spacer 16 in a vehicle suspension system 20. Without limitation intended, the vehicle suspension 20 shown is of a wish bone type that generally includes an upper control arm 22, lower control arm 30 and a sway bar 48 coupling a left and right suspensions. The upper control arm is shown including a camber adjustment with indicia 24 and toe adjustment markings at 26. A wheel or steering knuckle (not shown) is coupled to the lower control arm 30 and upper control arm 22 via the lower ball joint 52 and upper ball joint 54. The end of the upper control arm that couples to the wheel knuckle is designated at 64. The stabilizer bar 48 is coupled to stabilizer link 50 which is coupled to the lower arm 30 at the stabilizer mount aperture 36 formed in lower control arm 30. Ends 58 of the control arms 22 and 32 include bolt receiving inserts 60 that enable coupling of the control arms to the vehicle frame. Each strut suspension 20 includes a coil spring 38 and shock absorber 40. The lower control arm includes apertures 32 adapted to receive mounting bolts that fasten lower mount 44 of the shock absorber 40 to the lower control arm 30. An upper mount and bearing assembly 42 is shown that enables the fastening of the top end of the strut to the vehicle body.

Figure 6:
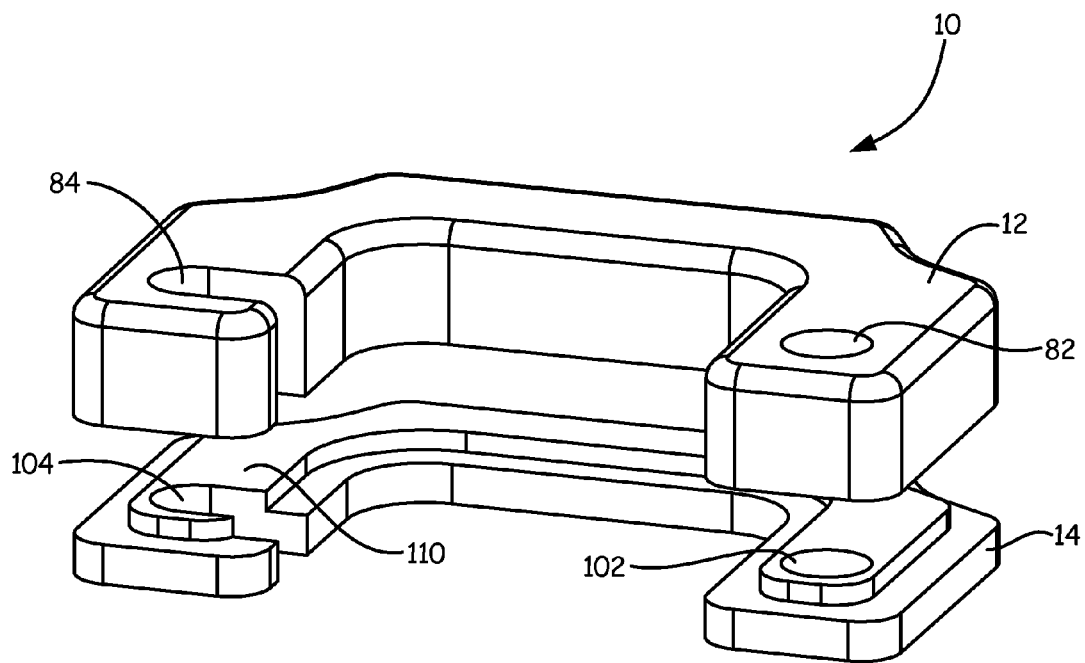
FIG. 6 is an upper front perspective view of the lower strut spacer combination in accordance with an embodiment of the invention.
Figure 7:
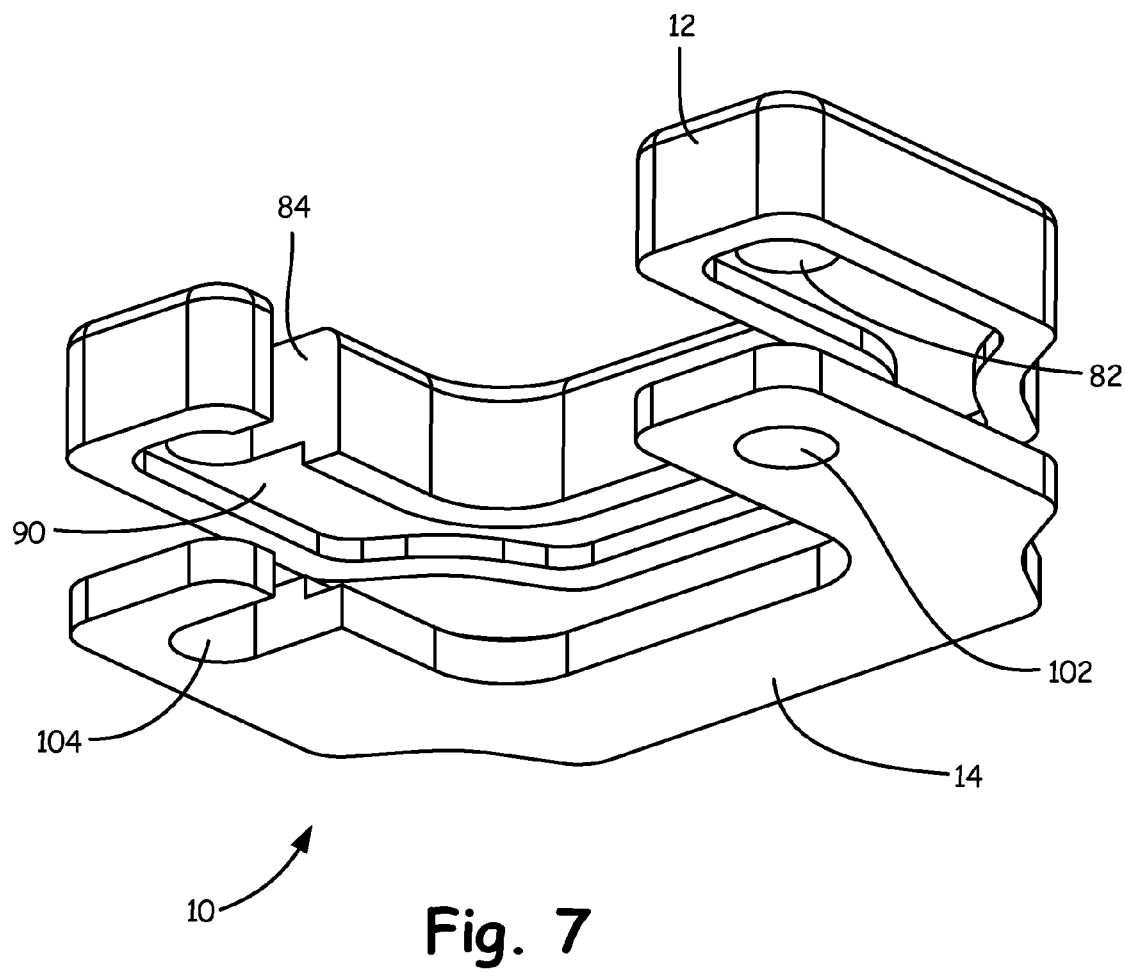
FIG. 7 is a lower front perspective view of the lower strut spacer combination of the type shown in FIG. 6.
Figure 8:
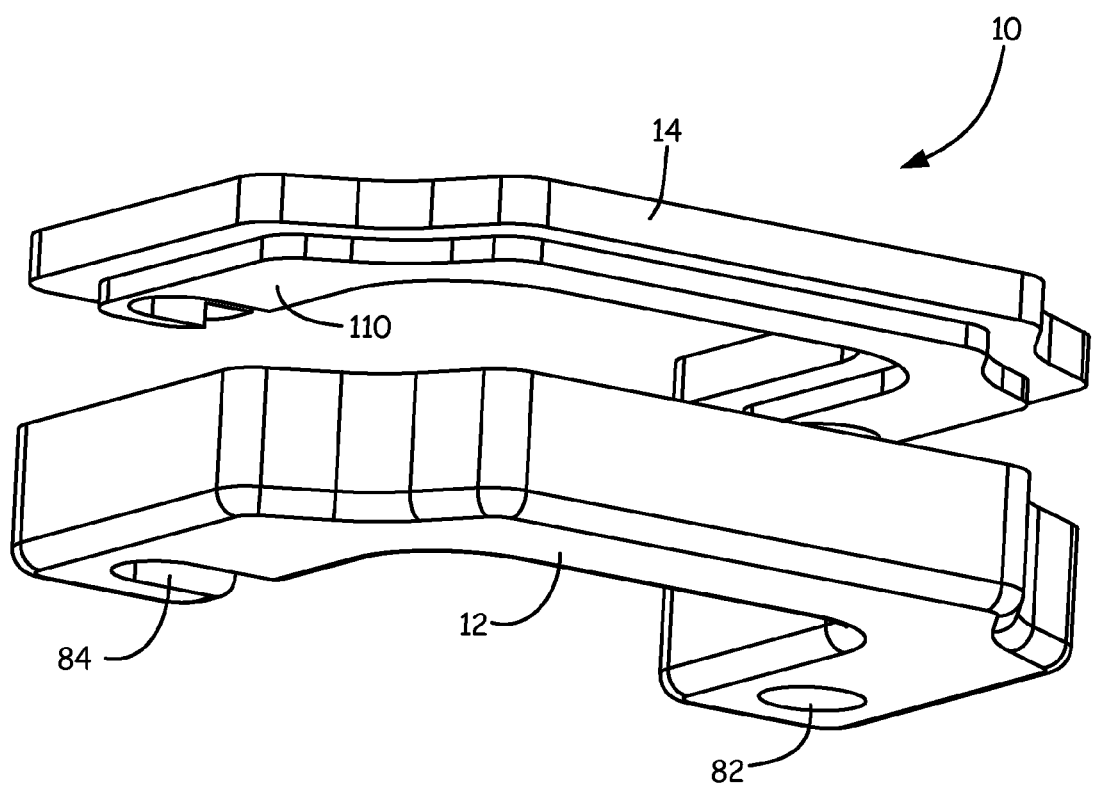
FIG. 8 is a back perspective view of the lower strut spacer combination of the type shown in FIG. 6.

FIGS. 6-8 illustrate a lower strut spacer combination 10. The strut spacers 10 include a first spacer 12 and second spacer 14. The first spacer 12 includes bolt aperture 82 and bolt slot 84. Similarly, the second spacer 14 includes bolt aperture 102 and bolt slot 104. Channel 90 in the first spacer 12 is adapted to receive ridge 110 of the second spacer. Those skilled in the art will appreciate that the spacer combination 10 may be comprised of multiple first spacers 12 or multiple second spacers 14 to provide further height adjustability.

Figure 9:
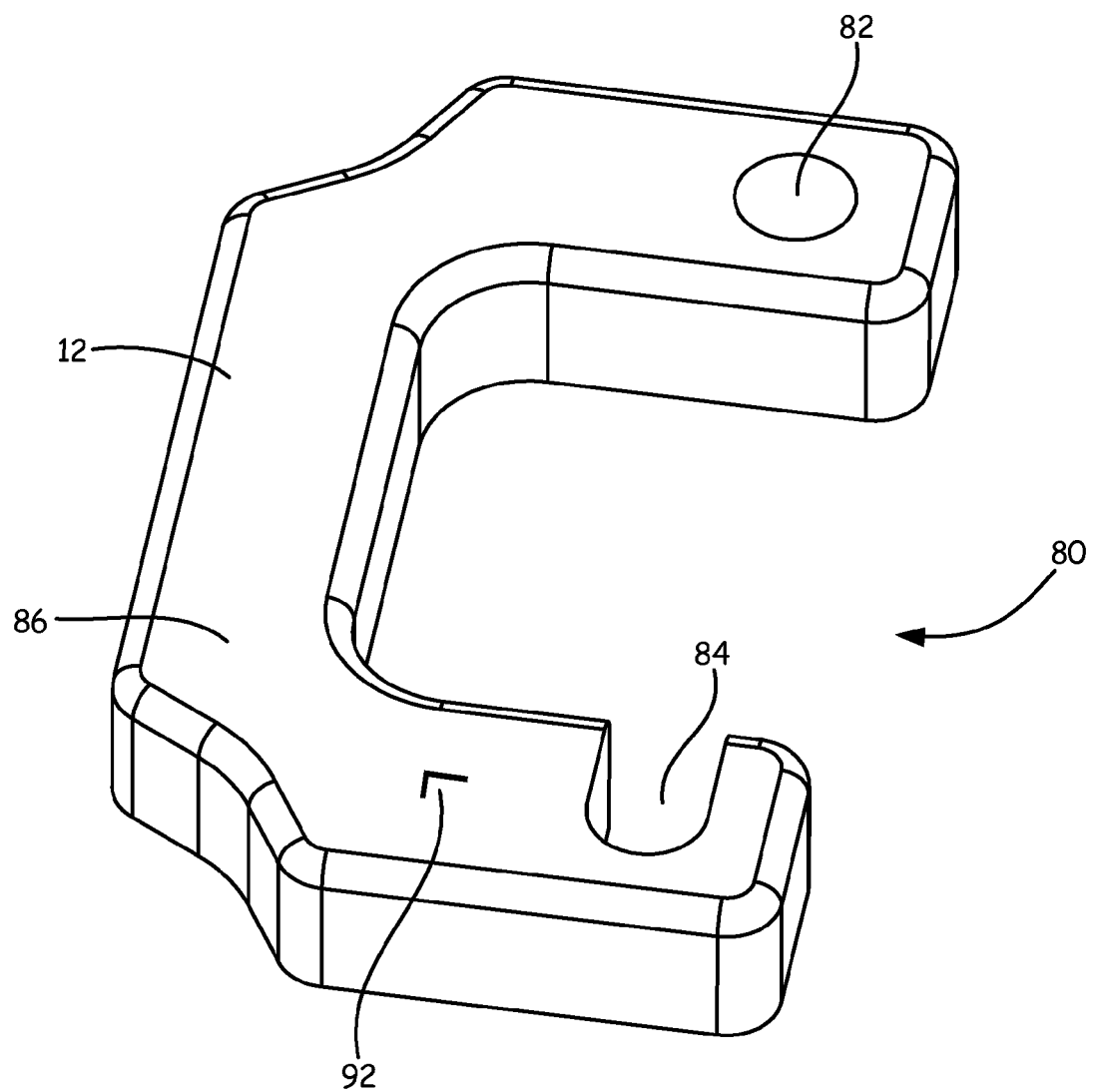
FIG. 9 is an upper end perspective view of a first lower strut spacer in accordance with an embodiment of the invention.
Figure 10:
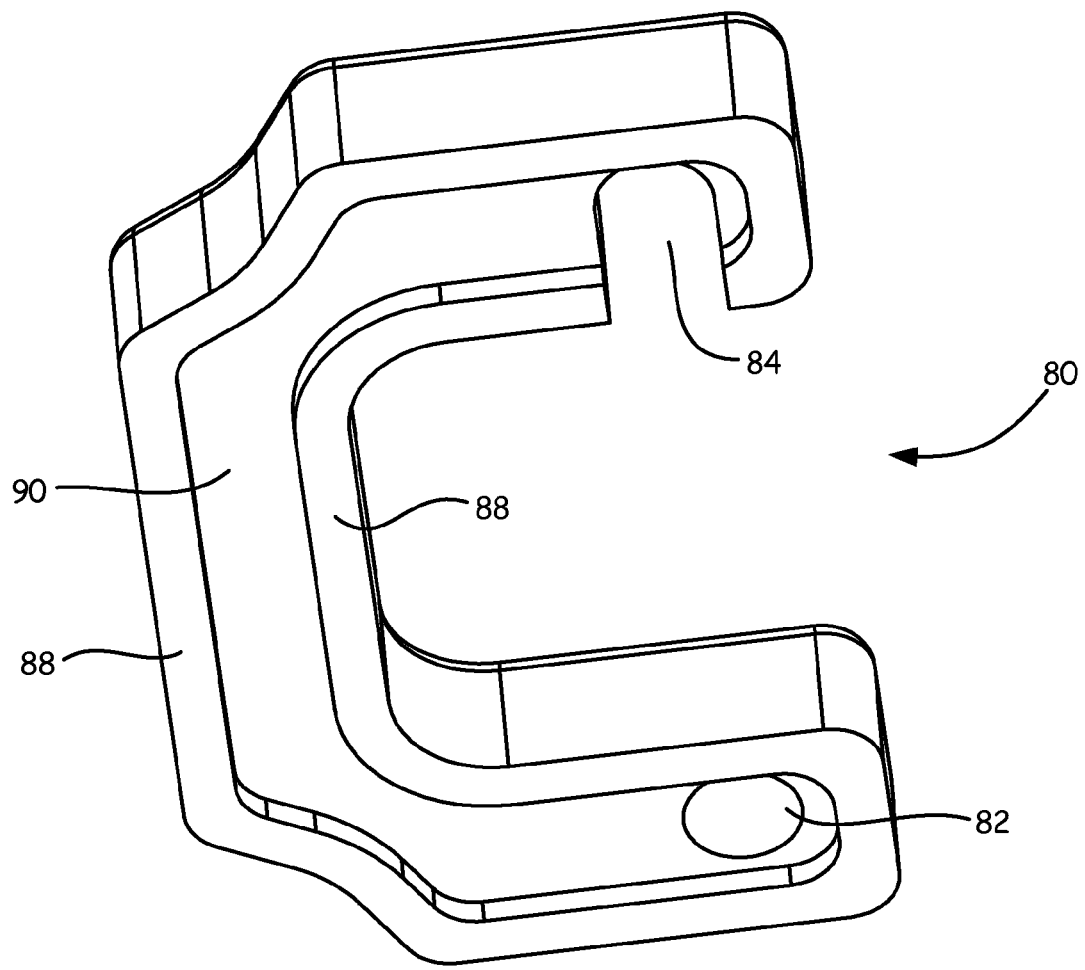
FIG. 10 is a lower end perspective view of the first lower strut spacer of the type shown in FIG. 9.

With reference to FIGS. 9 and 10 the first spacer 12 is shown in greater detail. The first spacer includes bolt receiving aperture 82 and bolt receiving slot 84 extending from top planar surface 86 to bottom planar surface 88. A channel is formed in the bottom planar surface 88. The spacer 12 is formed in a u-shape 80 with the aperture 82 positioned in one of the free ends of the u-shape and the slot 84 positioned in the opposing free end of the u-shape. The orientation of the slot relative to the free end will determine whether the spacer is best suited for installation on the left or right side suspension 20. Indicia 92 provides an indication to the user which suspension (left or right) the spacer should be installed. Those skilled in the art will appreciate that a combination of a first "left" spacer and second "right" spacer provides still further height adjustability.

Figure 11:
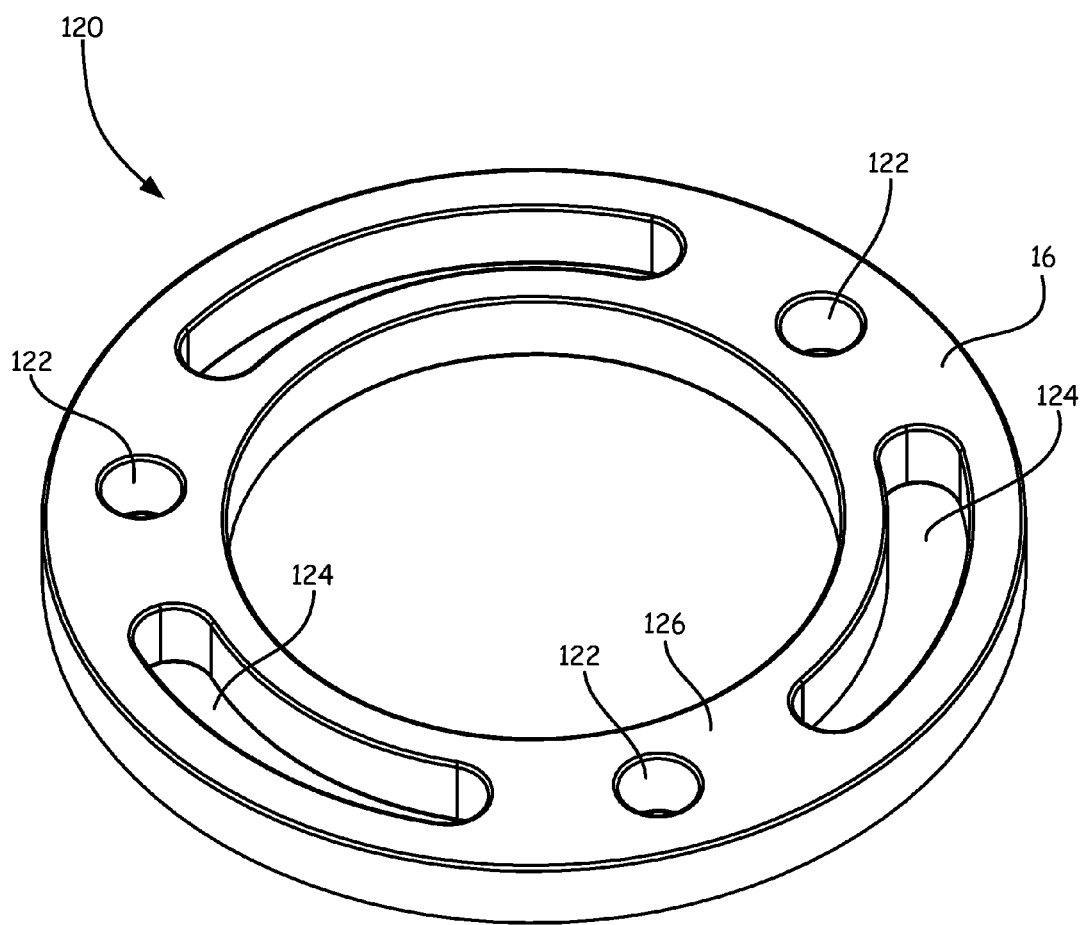
FIG. 11 is an upper end perspective view of an upper strut spacer in accordance with an embodiment of the invention.
Figure 12:
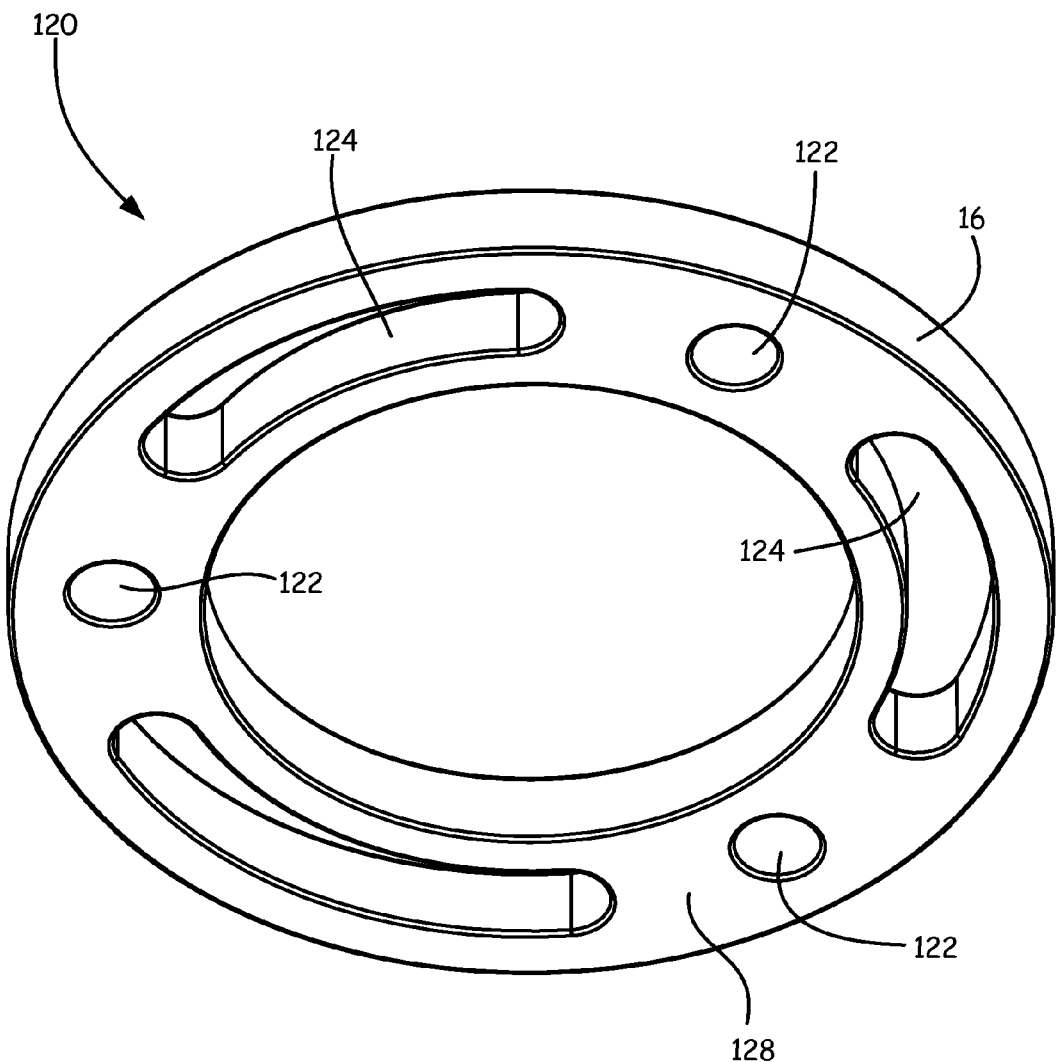
FIG. 12 is a lower end perspective view of the upper strut spacer of the type shown in FIG. 11.

With reference to FIGS. 11 and 12 the third spacer 16 is shown having a concentric cylindrical shape 120. Apertures 122 and slits 124 are spaced about the spacer and extend from a top planar surface 126 through the spacer to bottom planar surface 128. The apertures are spaced to receive and couple to the upper mount and bearing assembly 42.

Figure 13:
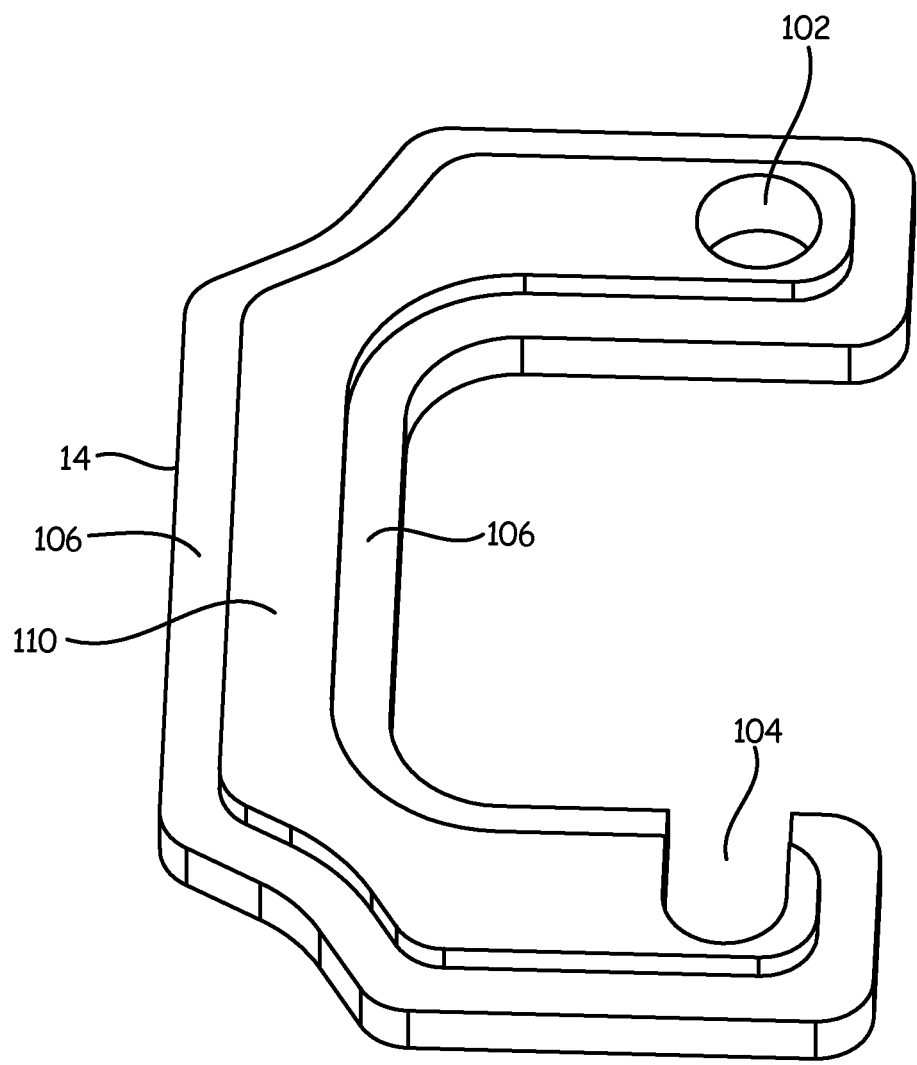
FIG. 13 is an upper end perspective view of the second lower strut spacer in accordance with an embodiment of the invention.
Figure 14:
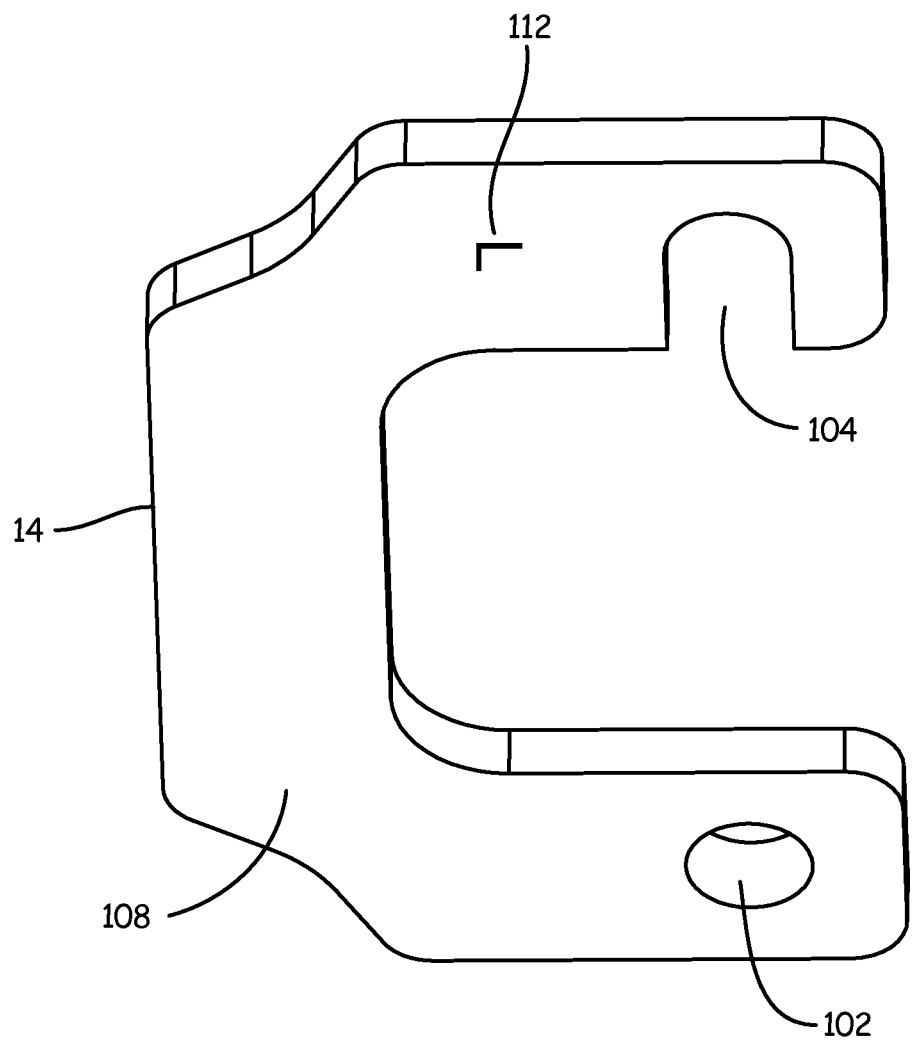
FIG. 14 is a lower end perspective view of the second lower strut spacer of the type shown in FIG. 13.

With reference to FIGS. 13 and 14 the second spacer 14 is shown in greater detail. The second spacer includes bolt receiving aperture 102 and bolt receiving slot 104 extending from top planar surface 106 to bottom planar surface 108. A ridge 110 extends from the bottom planar surface 108 and may be formed as a single continuous ridge (as shown) or may be segmented. The spacer 14 is formed in a u-shape 100 with the aperture 102 positioned in one of the free ends of the u-shape and the slot 104 positioned in the opposing free end of the u-shape. The orientation of the slot relative to the free end will determine whether the spacer is best suited for installation on the left or right side suspension 20. Indicia 112 provides an indication to the user which suspension (left or right) the spacer should be installed.

In use, in accordance with an aspect of the invention, after first and second bolts have been installed from above the control arm as previously described, the user begins the installation or removal of one or more spacers by unloosening nuts from the first and second bolts. The shock absorber 40 may be separated from the lower control arm to allow the desired spacers to be positioned between the lower mount and lower control arm. When separating the shock absorber from the lower control arm, the bolt aligned under the drive shaft slides within the strut mount aperture 32. The slots 84 and 102 allow the bolt to be positioned in the slots of the spacers without removing the bolt. After positioning and engaging the slot of the spacers with the first bolt, the other bolt may be inserted through the lower mount and spacer apertures 82 and 102 and the control arm aperture 32. Once in place, both bolts may be held in place with nuts of suitable construction.

In accordance with another aspect of the invention the thickness of the first spacer and second spacer may vary to provide still further height adjustability and allow the user to use either the combination 10 or one or the other spacers 12 and 14. In this manner the user may vary the height by many select distances while only requiring the use of two spacers. Further, each spacer of the present invention may be utilized independently or may be used in combination by nesting the first and second spacers together. The user may also install the third spacer 16 to further increase the height that the vehicle body is elevated above the ground.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for adjusting a height of a strut suspension, said apparatus comprising:
    a first plate having a u-shape, a top planar surface, a bottom planar surface, a first bolt receiving aperture and first bolt receiving void both extending through said first plate from the top planar surface to the bottom planar surface of said first plate, and said bolt receiving void further extending from an edge of said plate into said plate, and said first plate having channels formed in at least one of the top and bottom planar surfaces of the first plate; and
    a second plate having a u-shape, a top planar surface, bottom planar surface, a first bolt receiving aperture and first bolt receiving void both extending through said second plate from the top planar surface to the bottom planar surface of said second plate, and said bolt receiving void of said second plate further extending from an edge of said second plate into said second plate, and said second plate further having ridges extending outward from at least one of the top and bottom planar surfaces of the second plate, wherein said ridges are sized to engage the channels of said first plate in a mating relation.

2. The apparatus as recited in claim 1 further including a third plate having bolt receiving apertures extending through the third plate from a top planar surface to a bottom planar surface of said third plate.

3. The apparatus as recited in claim 1, wherein said bolt receiving void of said first plate extends from an inner edge of said u-shaped first plate.

4. The apparatus as recited in claim 1, wherein said bolt receiving void of said second plate extends from an inner edge of said u-shaped second plate.

5. The apparatus as recited in claim 3, wherein said third plate is a cylindrical shape.

6. The apparatus as recited in claim 1, wherein one of said first and second plates engage a lower mount of a strut.

7. The apparatus as recited in claim 5, wherein said third plate engages an upper mount of the strut.

8. An apparatus for adjusting a height of a strut suspension, said apparatus comprising:
    a first u-shaped plate having a first bolt receiving aperture and first bolt receiving slot both extending through said first plate from a top planar surface to a bottom planar surface of said first plate, said slot of said first u-shaped plate also extending inward from an outer side of said first u-shaped plate;
    channels formed in at least one of the top and bottom planar surfaces of the first plate;
    a second u-shaped plate having a first bolt receiving aperture and first bolt receiving slot both extending through said second plate from a top planar surface to a bottom planar surface of said second plate, said slot of said second u-shaped plate also extending inward from an outer side of said second u-shaped plate;

ridges extending outward from at least one of the top and bottom planar surfaces of the second plate, wherein said ridges are sized to fit within the channels of said first plate in a mating relation; and a third cylindrical shaped plate having bolt receiving apertures extending through the third plate from a top planar surface to a bottom planar surface of said third plate.

9. The apparatus as recited in claim 8, wherein one of said first and second plates engage a lower mount of a strut.

10. The apparatus as recited in claim 8, wherein said third plate engages an upper mount of the strut.

11. An apparatus for adjusting a height of a strut suspension, said apparatus comprising:

a first plate having a u-shape, a top planar surface, a bottom planar surface, a first bolt receiving aperture and first bolt receiving slot both extending through said first plate from the top planar surface to the bottom planar surface of said first plate, and said bolt receiving slot further extending from an edge of said plate into said plate, and said first plate having channels formed in at least one of the top and bottom planar surfaces of the first plate;

a second plate having a u-shape, a top planar surface, bottom planar surface, a first bolt receiving aperture and first bolt receiving void both extending through said second plate from the top planar surface to the bottom planar surface of said second plate, and said bolt receiving void of said second plate further extending from an edge of said second plate into said second plate, and said second plate further having ridges extending outward from at least one of the top and bottom planar surfaces of the second plate, wherein said ridges are sized to engage the channels of said first plate in a mating relation; and a third plate having bolt receiving apertures extending through the third plate from a top planar surface to a bottom planar surface of said third plate.

12. The apparatus as recited in claim 11, wherein said bolt receiving slot of said first plate extends from an inner edge of said u-shaped first plate.

13. The apparatus as recited in claim 11, wherein said bolt receiving void of said second plate extends from an inner edge of said u-shaped second plate.

14. The apparatus as recited in claim 12, wherein said third plate is a cylindrical shape.

15. The apparatus as recited in claim 11, wherein one of said first and second plates engage a lower mount of a strut.

16. The apparatus as recited in claim 14, wherein said third plate engages an upper mount of the strut.

\* \* \* \* \*